US012378794B1

(12) United States Patent
Miller

(10) Patent No.: US 12,378,794 B1
(45) Date of Patent: Aug. 5, 2025

(54) SLIDING DOOR HANDLE AND METHOD OF INSTALLATION

(71) Applicant: Robert Miller, Port Charlotte, FL (US)

(72) Inventor: Robert Miller, Port Charlotte, FL (US)

( * ) Notice: Subject to any disclaimer, the term of this patent is extended or adjusted under 35 U.S.C. 154(b) by 0 days.

(21) Appl. No.: 18/776,335

(22) Filed: Jul. 18, 2024

(51) Int. Cl.
*E05B 1/00* (2006.01)

(52) U.S. Cl.
CPC .................................. *E05B 1/0038* (2013.01)

(58) Field of Classification Search
CPC ..................................................... E05B 1/0038
See application file for complete search history.

(56) References Cited

U.S. PATENT DOCUMENTS 4,185,479 A * 1/1980 Riegelman .......... E05B 65/0835 70/95
4,486,041 A * 12/1984 Takasaki ................. E05C 3/162 292/336.3
5,979,949 A * 11/1999 Finkelstein ............. E05B 83/04 292/29
6,023,952 A * 2/2000 Mantarakis ............. E05B 53/00 292/336.3
6,945,572 B1 * 9/2005 Hauber ............... E05B 65/0811 70/95
2004/0217600 A1 * 11/2004 Argo ..................... E05C 19/003 292/241
2005/0104388 A1 * 5/2005 Takes .................... E05C 9/1875 292/336.3
2007/0200370 A1 * 8/2007 Reithmeyer ............ E05B 63/18 292/340
2007/0222228 A1 * 9/2007 Tsai ........................ E05B 63/06 292/26
2009/0115204 A1 * 5/2009 Rycroft ................... E05B 63/20 70/276
2010/0327612 A1 * 12/2010 Liebel ....................... E05B 1/00 292/336.3
2013/0200636 A1 * 8/2013 Hagemeyer ............... E05C 3/14 292/202
2015/0300047 A1 * 10/2015 Leong ...................... H05K 7/18 29/592.1

* cited by examiner

*Primary Examiner* — Mark A Williams
(74) *Attorney, Agent, or Firm* — Bryan L. Loeffler, Esq.; LOEFFLER IP GROUP, P.A.

(57) ABSTRACT

A handle assembly (1) having an exterior grab bar and a method for retrofitting existing recessed handle assemblies to add an exterior gab bar handle (16) wherein the security of the recessed handle assembly is not affected.

3 Claims, 6 Drawing Sheets

SLIDING DOOR HANDLE AND METHOD OF INSTALLATION

FIELD OF THE INVENTION

The present invention relates generally to sliding patio door handles and, more particularly, to a handle assembly having an exterior grab-bar style handle and a method of retrofitting existing flush mounted handles to add an exterior grab-bar handle to a sliding patio door.

BACKGROUND OF THE INVENTION

Sliding patio doors commonly utilize low-profile flush mounted lock and handle assemblies. Such assemblies come standard with recessed handles that are actuated using one's fingertips, which pose problems for individuals with poor dexterity and hand-strength.

A solution to this problem is to add a grab-bar style handle to the interior surface of the assembly. This is accomplished by using existing bolts holding the assembly together, that are only accessible from the interior surface of the assembly. However, this is only a partial solution as conventional flush mounted handle assemblies do not provide any exterior bolts, bolt holes, or any other mechanisms for adding a grab-bar handle to the exterior surface.

Therefore, a need exists for a flush mounted handle assembly having an exterior grab-bar handle and a method for retrofitting existing flush mounted handle assemblies to add an exterior gab bar handle wherein the security of the flush mounted handle assembly is not affected.

SUMMARY OF THE INVENTION

The primary object of the present invention is to provide a flush mounted handle assembly having an exterior grab-bar handle wherein the structural integrity of the assembly is not diminished by the addition of the exterior grab-bar handle.

An additional object of the present invention is to provide a method for retrofitting existing flush mounted handles to add an exterior grab-bar handle wherein the addition of the exterior grab-bar handle will not diminish the structural integrity of the assembly.

The present invention achieves the above and other objects by providing a flush mounted handle and lock assembly for use on sliding patio doors wherein an exterior grab-bar handle is secured to the assembly using shortened screws that are inserted into existing threaded tubes. The threaded tubes are also used to attach an interior section of the handle assembly using a top interior bolt and a bottom interior bolt, both of which extend through the housing far enough to secure the two halves of the housing together and to the door while leaving space in the exterior half of the threaded tube for accepting a top exterior screw and a bottom exterior screw to attach the exterior grab-bar handle. Thus, the exterior handle may be removed without disassembly the housing, thereby avoiding previous security concerns directed toward adding exterior grab-bar handles to flush mounted patio door handles.

Exterior access holes that allow the interior threaded tubes to be accessed may be integrated into a new handle assembly and housing or added to an existing handle assembly and housing by drilling access holes in line with the existing threaded tubes inside the housing.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
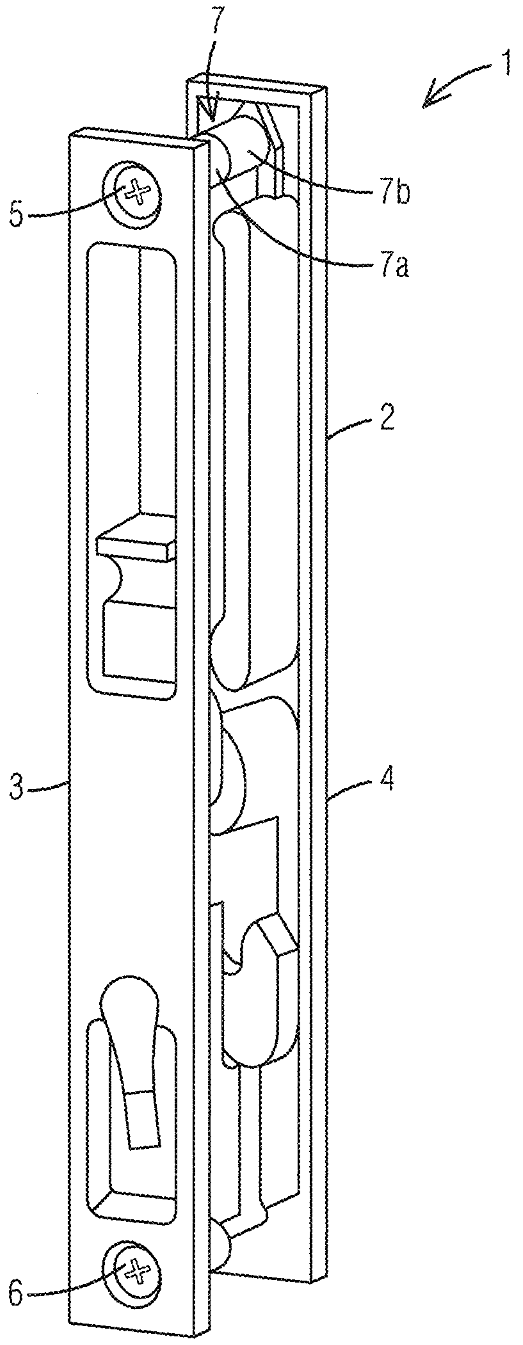
FIG. 1 is a perspective view of an interior side of a conventional flush mounted sliding patio door handle.
Figure 2:
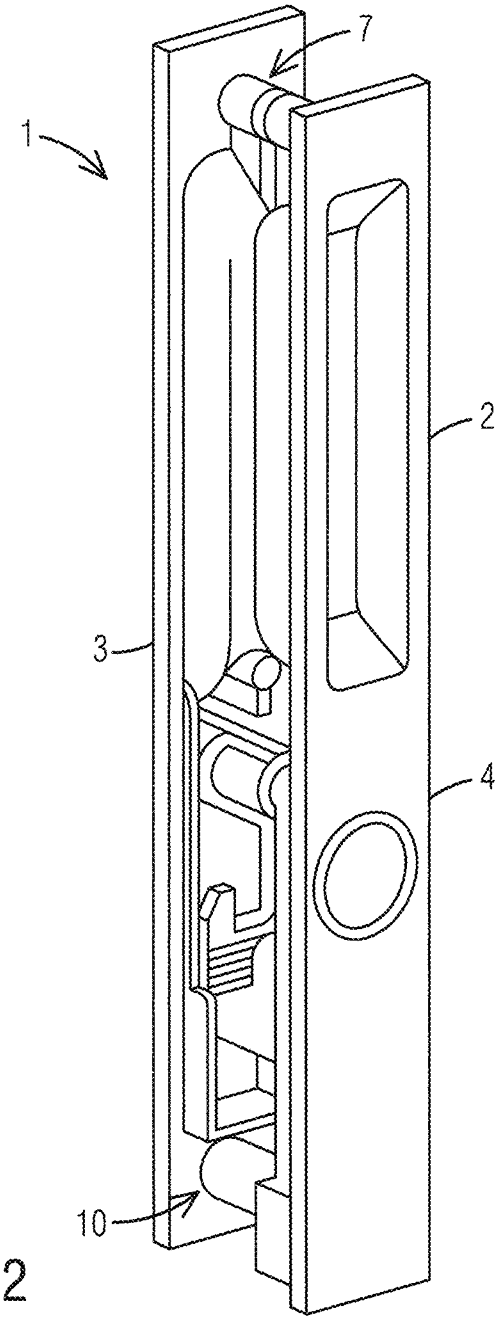
FIG. 2 is a perspective view of an exterior side of a conventional flush mounted sliding patio door handle.
Figure 3:
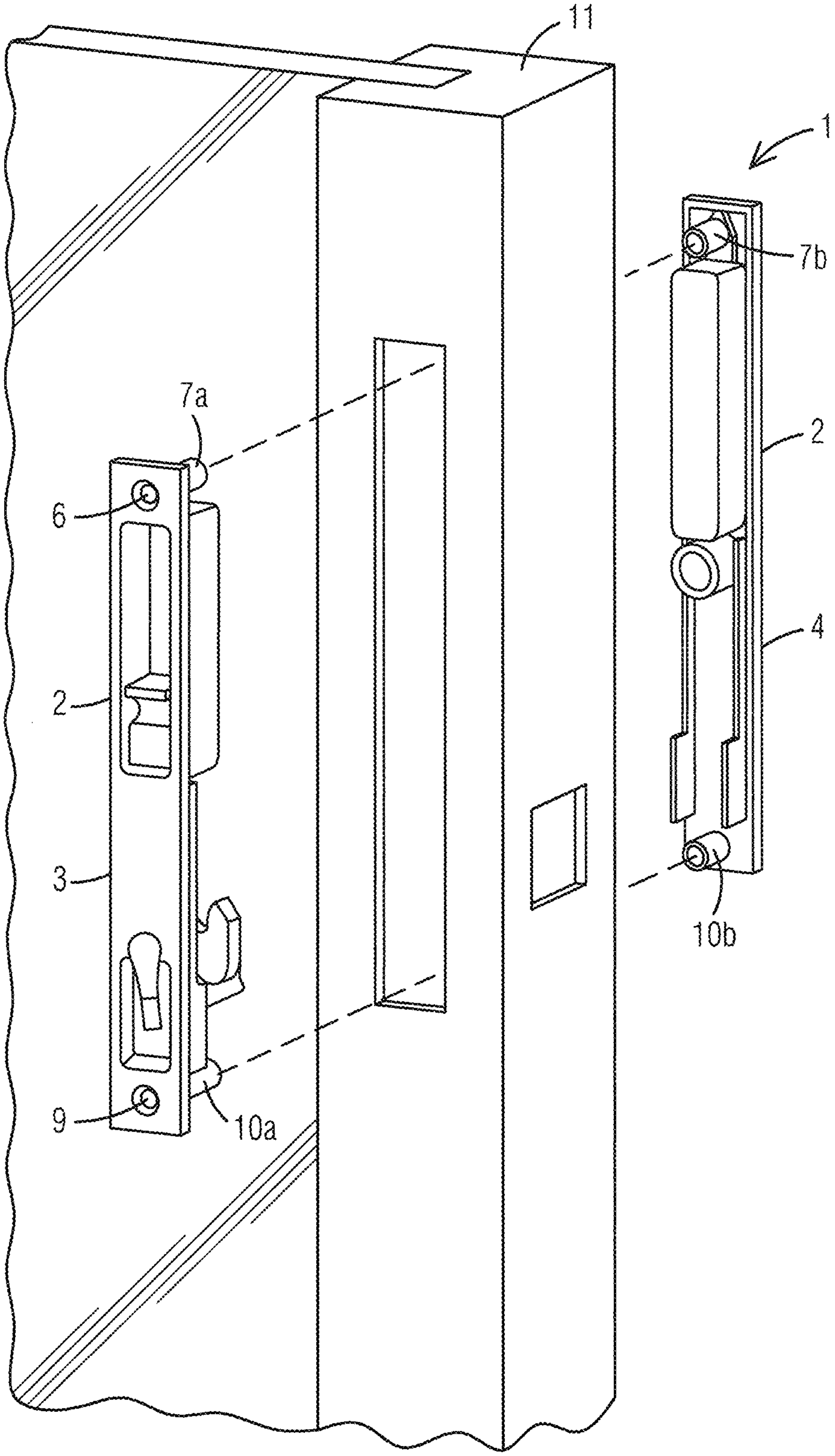
FIG. 3 is an exploded perspective view of an interior side of a conventional flush mounted sliding patio door handle being installed on a patio door frame.

For purposes of describing the preferred embodiment, the terminology used in reference to the numbered accessories in the drawings is as follows:

1. flush mounted handle assembly, generally
2. housing
3. interior half of housing
4. exterior half of housing
5. top interior bolt
6. top interior bolt hole
7. top threaded tubular sleeve
7*a*. interior half of bottom threaded tubular sleeve
7*b*. exterior half of bottom threaded tubular sleeve
8. bottom interior bolt
9. bottom interior bolt hole
10. bottom threaded tubular sleeve
10*a*. interior half of bottom threaded tubular sleeve
10*b*. exterior half of bottom threaded tubular sleeve
11. patio door frame
12. top exterior bolt hole
13. bottom exterior bolt hole
14. top exterior bolt
15. bottom exterior bolt
16. grab-bar handle
17. top binding post nut
18. bottom binding post nut
19. head of binding post nut With reference to FIGS. 1 and 2, interior and exterior perspective views, respectively, of a conventional flush mounted handle assembly 1 are illustrated. The flush mounted handle assembly 1 comprises a housing 2 having an interior half 3 and an exterior half 4 connected to each other by a top interior bolt 5 inserted through a top interior bolt hole 6 and into a top threaded tubular sleeve 7; and a bottom interior bolt 8 inserted through a bottom interior bolt hole 9 and into a bottom threaded tubular sleeve 10.

The top threaded tubular sleeve 7 comprises an interior half 7*a* and an exterior half 7*b*. Likewise, the bottom threaded tubular sleeve 10 comprises an interior half 10*a* and an exterior half 10*b*.

To install the assembly 1 on a patio door frame 11, the top interior bolt 5 is inserted through the top interior bolt hole 6, through the interior half 7*a* of the top threaded tubular sleeve 7, and only partially extending into the exterior half 7*b* of the top threaded tubular sleeve 7. Likewise, the bottom interior bolt 8 is inserted through the bottom interior bolt hole 9, through the interior half 10*a* of the bottom threaded tubular sleeve 10, and only partially extending into the exterior half 10*b* of the bottom threaded tubular sleeve 10.

Figure 4:
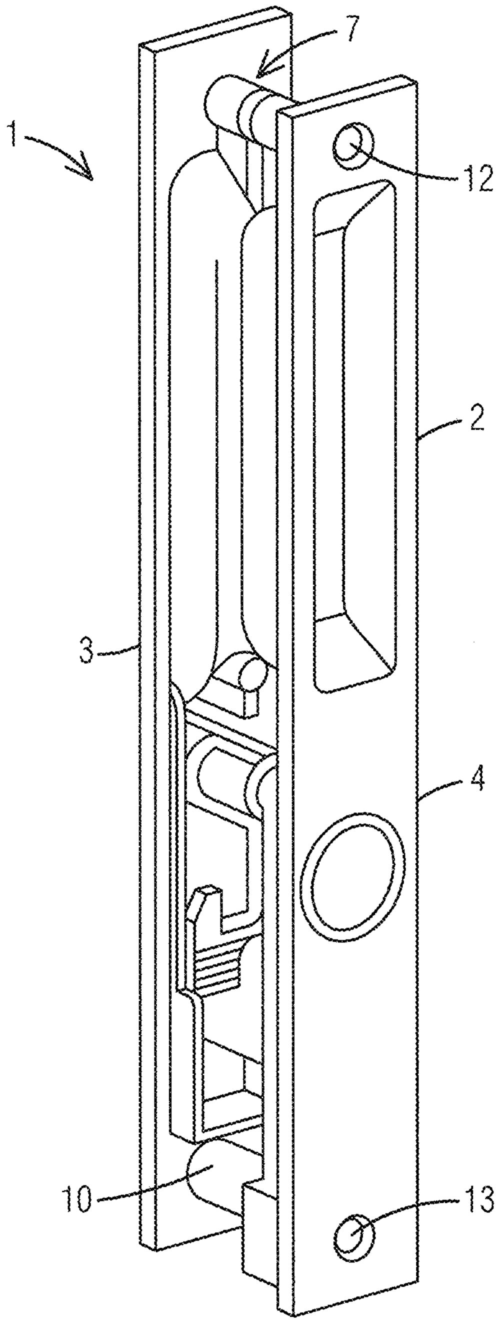
FIG. 4 is a perspective view of an exterior side of a sliding patio door handle of the present invention having added access holes.
Figure 5:
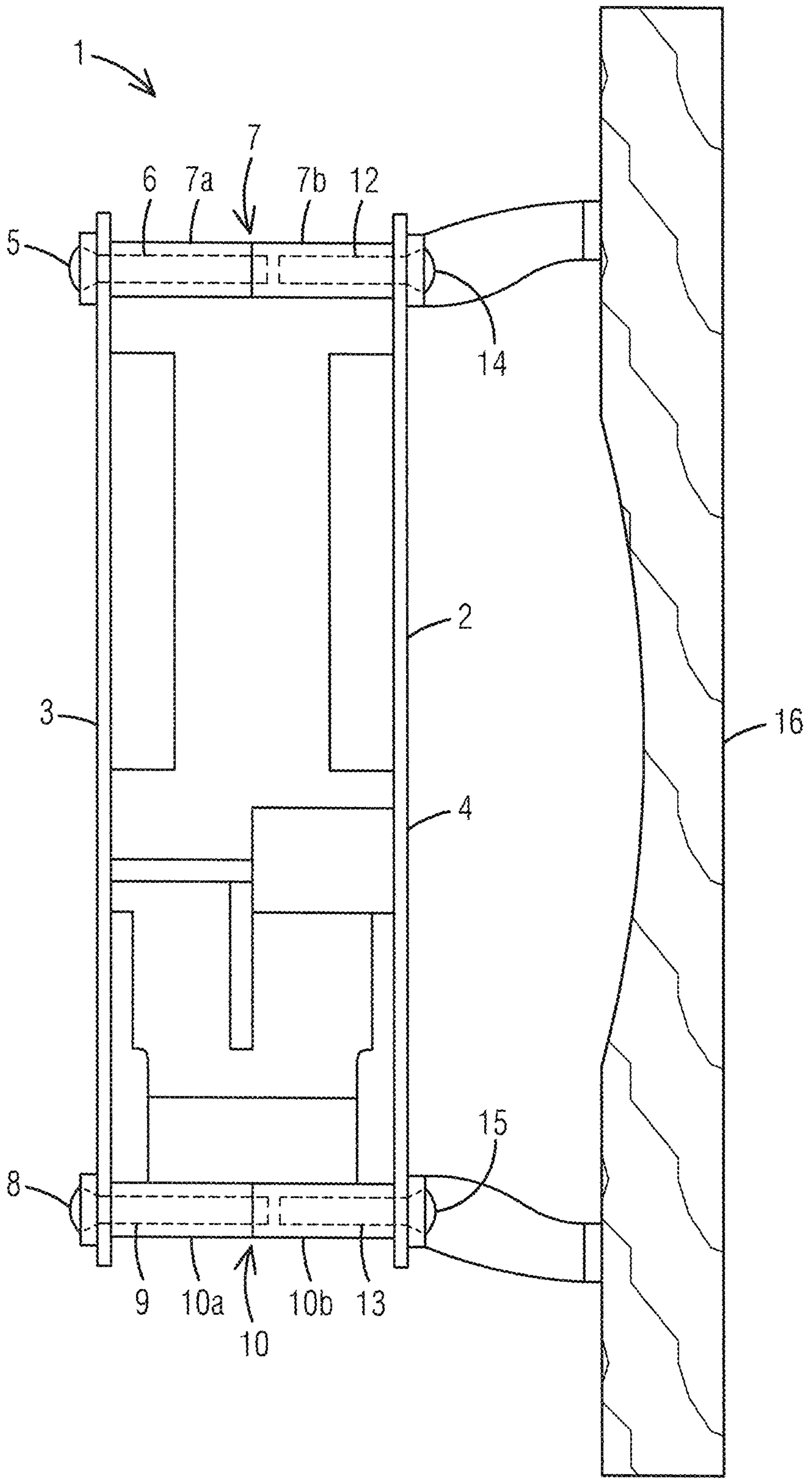
FIG. 5 is a front plan view of a sliding patio door handle of the present invention having an exterior handle attached thereto using the method of the present invention.

As illustrated in FIG. 4, the present invention comprises a step of adding a top exterior bolt hole 12 and a bottom exterior bolt hole 13 to the exterior half of the housing 4 to provide access to the exterior half 7*b* of the top threaded tubular sleeve 7 and the exterior half 10*b* of the bottom threaded tubular sleeve 10. In addition, a top exterior bolt hole 12 and a bottom exterior bolt hole 13 may be tapped to add extra threading. Then, as illustrated in FIG. 5, an exterior grab-bar handle 16 may be attached to the exterior half of the housing 4 by placing a top exterior bolt 15 through the top exterior bolt hole 12 and into the exterior half 7*b* of the top threaded tubular sleeve 7 wherein the top exterior bolt 14 only extends into a portion of the exterior half 7*b* of the top threaded tubular sleeve 7. The top exterior bolt 15 may be a bolt, screw, self-tapping screw, rivet, or other equivalent attachment means. Likewise, a bottom exterior bolt 15 is placed through the bottom exterior bolt hole 13 and into the exterior half 10*b* of the bottom threaded tubular sleeve 10 wherein the bottom exterior bolt 15 only extends into a portion of the exterior half 10*b* of the bottom threaded tubular sleeve 10. The bottom exterior bolt 15 may be a bolt, screw, self-tapping screw, or other equivalent attachment means.

To ensure the exterior bolts do not engage the interior half of the housing, the top interior bolt 6 has a length that is longer than a length of the top exterior bolt 14. Likewise, the bottom interior bolt 8 has a length that is longer than a length of the top exterior bolt 15.

Figure 6:
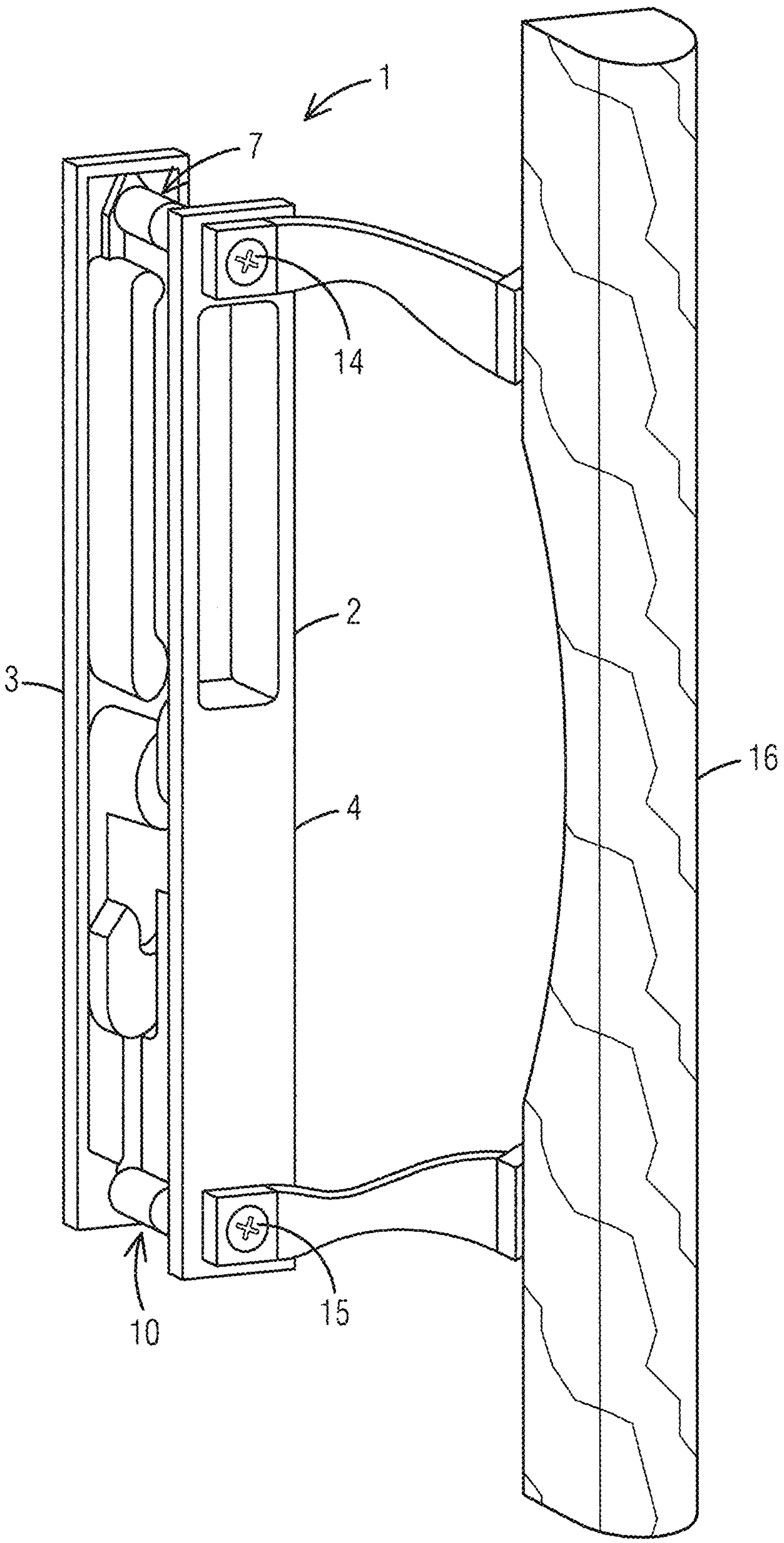
FIG. 6 is a perspective view of an exterior side of a sliding patio door handle of the present invention having grab-bar handle installed thereon.
Figure 7:
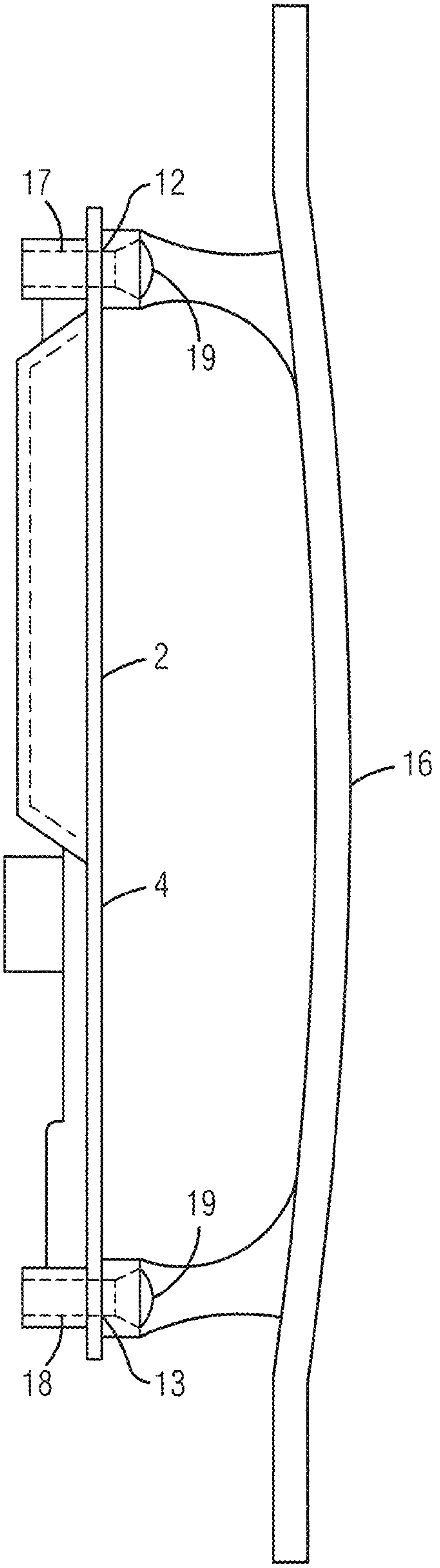
FIG. 7 is a front plan view of an exterior half of the housing wherein binding post nuts are used to attach an exterior grab-bar handle.

With general reference to FIG. 6, a front plan view of the exterior half 4 of the housing 2 wherein binding post nuts 17, 18 are used to attach an exterior grab-bar handle 16 is illustrated. Alternatively, a top binding post nut 17 and a bottom binding post nut 18 may be inserted though the exterior grab-bar handle 16 and/or through the top and bottom bolt holes 11, 13, respectively. The heads 19 of the binding post nuts 17, 18 are preferably tamper proof so that the binding post nuts 17, 18 may not be rotated and/or removed from the housing 2 after installation. The top interior bolt 6 and the bottom interior bolt 8 each engage the top binding post nut 17 and the bottom post nut 18, respectively, to secure the interior half of the housing 3 to the exterior half of the housing 4.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A handle assembly for a sliding patio door, said handle assembly comprising:

a housing having an interior section and an exterior section connected to each other by a top interior bolt inserted through a top interior bolt hole and into a top threaded tubular sleeve and a bottom interior bolt inserted through a bottom interior bolt hole and into a bottom threaded tubular sleeve;

said top threaded tubular sleeve having an interior half extending from the interior section of the housing and an exterior half extending from the exterior section of the housing;

said bottom threaded tubular sleeve having an interior half extending from the interior section of the housing and an exterior half extending from the exterior section of the housing;

said top interior bolt being inserted through the top interior bolt hole, through the interior half of the top threaded tubular sleeve, and only partially extending into the exterior half of the top threaded tubular sleeve;

said bottom interior bolt being inserted through the bottom interior bolt hole, through the interior half of the bottom threaded tubular sleeve, and only partially extending into the exterior half of the bottom threaded tubular sleeve;

a top exterior bolt hole located on the exterior section of the housing to provide access to the exterior half of the top threaded tubular sleeve a bottom exterior bolt hole located on the exterior section of the housing to provide access to the exterior half of the bottom threaded tubular sleeve;

an exterior grab-bar handle attached to the exterior section of the housing by a top exterior bolt extending through the top exterior bolt hole and an into an exterior half of the top threaded tubular sleeve wherein the top exterior bolt only extends into a portion of the exterior half of the top threaded tubular sleeve; and said exterior grab-bar handle being further attached to the exterior section of the housing by a bottom exterior bolt extending through the bottom exterior bolt hole and an into the exterior half of the bottom threaded tubular sleeve wherein the bottom exterior bolt only extends into a portion of the exterior half of the bottom threaded tubular sleeve.

2. A method of adding a grab-bar handle to a flush mount handle assembly for a sliding patio door, said method comprising the steps of:

securing a housing having an interior section and an exterior section to a patio door frame by inserting a top interior bolt through a top interior bolt hole located on the interior section of the housing and into a top threaded tubular sleeve;

inserting a bottom interior bolt through a bottom interior bolt hole located on the interior section of the housing and into a bottom threaded tubular sleeve;

said top threaded tubular sleeve having an interior half extending from the interior section of the housing and an exterior half extending from the exterior section of the housing;

said bottom threaded tubular sleeve having an interior half extending from the interior section of the housing and an exterior half extending from the exterior section of the housing;

inserting said top interior bolt being through the top interior bolt hole, through the interior half of the top threaded tubular sleeve, and only partially extending into the exterior half of the top threaded tubular sleeve;

inserting said bottom interior bolt through the bottom interior bolt hole, through the interior half of the bottom threaded tubular sleeve, and only partially extending into the exterior half of the bottom threaded tubular sleeve;

placing a top exterior bolt hole on the exterior section of the housing to provide access to the exterior half of the top threaded tubular sleeve;

placing a bottom exterior bolt hole on the exterior section of the housing to provide access to the exterior half of the bottom threaded tubular sleeve;

attaching an exterior grab-bar handle to the exterior section of the housing by inserting a top exterior bolt through the top exterior bolt hole and an into the exterior half of the top threaded tubular sleeve wherein the top exterior bolt only extends into a portion of the exterior half of the top threaded tubular sleeve; and further attaching the exterior grab-bar handle to the exterior section of the housing by inserting a bottom exterior bolt through the bottom exterior bolt hole and an into the exterior half of the bottom threaded tubular sleeve wherein the bottom exterior bolt only extends into a portion of the exterior half of the bottom threaded tubular sleeve.

3. A method of adding a grab-bar handle to a flush mount handle assembly for a sliding patio door, said method comprising the steps of:

securing a housing having an interior section and an exterior section to a patio door frame by inserting a top interior bolt through a top interior bolt hole located on the interior section of the housing and into a top threaded tubular sleeve;

inserting a bottom interior bolt through a bottom interior bolt hole located on the interior section of the housing and into a bottom threaded tubular sleeve;

said top threaded tubular sleeve having an interior half extending from the interior section of the housing and an exterior half extending from the exterior section of the housing;

said bottom threaded tubular sleeve having an interior half extending from the interior section of the housing and an exterior half extending from the exterior section of the housing;

inserting said top interior bolt being through the top interior bolt hole, through the interior half of the top threaded tubular sleeve, and only partially extending into the exterior half of the top threaded tubular sleeve;

inserting said bottom interior bolt through the bottom interior bolt hole, through the interior half of the bottom threaded tubular sleeve, and only partially extending into the exterior half of the bottom threaded tubular sleeve;

placing a top exterior bolt hole on the exterior section of the housing to provide access to the exterior half of the top threaded tubular sleeve;

placing a bottom exterior bolt hole on the exterior section of the housing to provide access to the exterior half of the bottom threaded tubular sleeve;

attaching an exterior grab-bar handle to the exterior section of the housing by inserting a top binding barrel nut through the top exterior bolt hole; and further attaching the exterior grab-bar handle to the exterior section of the housing by inserting a bottom binding barrel nut through the bottom exterior bolt hole.

* * * * *